(12) United States Patent
Kim et al.

(10) Patent No.: US 6,831,134 B2
(45) Date of Patent: Dec. 14, 2004

(54) METHOD FOR PREPARING TRANSPARENT BLOCK COPOLYMER RESIN, COPOLYMER PREPARED THEREBY, AND USAGE THEREOF

(75) Inventors: Sam-Min Kim, Daejeon (KR); Jong-Geun Kim, Daejeon (KR); Jong-Hyun Park, Daejeon (KR)

(73) Assignee: Korea Kumho Petrochemical Co., Ltd. (KR)

( * ) Notice: Subject to any disclaimer, the term of this patent is extended or adjusted under 35 U.S.C. 154(b) by 0 days.

(21) Appl. No.: 10/292,731

(22) Filed: Nov. 12, 2002

(65) Prior Publication Data

US 2003/0158345 A1 Aug. 21, 2003

(30) Foreign Application Priority Data

Dec. 12, 2001 (KR) ........................................ 2001-78405

(51) Int. Cl.[7] ............................ C08F 297/04; C08F 2/04
(52) U.S. Cl. ........................ 525/316; 525/98; 525/297; 525/332.2; 525/250; 526/79
(58) Field of Search ..................... 525/316, 98, 297, 525/332.2, 250; 526/79

(56) References Cited

U.S. PATENT DOCUMENTS 4,704,434 A * 11/1987 Kitchen et al. ............. 525/250
6,420,486 B1 * 7/2002 DePorter et al. ............ 525/314

* cited by examiner

*Primary Examiner*—James J. Seidleck
*Assistant Examiner*—Olga Asinovsky
(74) *Attorney, Agent, or Firm*—Cook, Alex, McFarron, Manzo, Cummings & Mehler, Ltd.

(57) ABSTRACT

The present invention relates to a method for preparing a copolymer containing a combined linear and nonlinear block, that is, mikto block, a copolymer prepared from the method, and usages of the copolymer. More particularly, the present invention provides a novel method for preparing a multi-component copolymer by polymerization using a multifunctional compound and one charge of an initiator, and a copolymer having a mikto block including different types of terminal blocks.

84 Claims, No Drawings

METHOD FOR PREPARING TRANSPARENT BLOCK COPOLYMER RESIN, COPOLYMER PREPARED THEREBY, AND USAGE THEREOF

BACKGROUND OF THE INVENTION

1. The Field of the Invention

The present invention relates to a method for preparing a transparent block copolymer resin, a copolymer prepared from the method, and usages of the copolymer. More particularly, the present invention relates to a method for preparing a novel multicomponent copolymer that includes polymerizing only one charge of an initiator and using a multifunctional compound, unlike the conventional methods for preparing a multicomponent copolymer mixture that include polymerizing two or more charges each of an initiator, and to a mikto block copolymer with different terminal blocks prepared from the method.

2. Related Prior Art

A general purpose polystyrene(GPPS) is desirable in the aspect of inexpensiveness, processability, transparency and rigidity but inferior in flexibility and toughness.

High impact polystyrene (HIPS) invented to improve those inferior properties of GPPS remarkably improves the brittleness of polystyrene resins because of its structural characteristic that polybutadiene rubber particles are dispersed in the polystyrene. But HIPS is also disadvantageous in transparency, which is one of the strongest points of the polystyrene, as well as flexibility.

In an attempt to solve this problem, many studies have been made on the polystyrene resins excellent in transparency, rigidity, flexibility and strength, as a consequence of which block copolymers prepared by anionic polymerization using an organic metal compound as an initiator have been suggested.

The technologies of the conventional block copolymers prepared by anionic polymerization using an organic metal compound as an initiator are, however, problematic in that such an attempt to produce multi-block and multi-component copolymers for the balance of the above-mentioned properties complicates the polymerization process and only limitedly realizes the properties.

For example, U.S. Pat. Nos. 4,584,346, 5,705,569 and 6,096,828 disclose a method for preparing various block copolymers using two or more charges of an initiator and monomers. This method, which may be advantageous to provide balanced mechanical properties, requires more carefulness in controlling the purity and the amount of monomers added in multiple steps and solvents, and the added amount of the initiator, and involves a long polymerization time, thereby causing a problems in productivity and processability.

The copolymer employing a relatively simple polymerization method is represented by S-B/S, where S is a vinyl aromatic block; and B/S is a tapered block formed by simultaneously or sequentially contacting a conjugated diene monomer and a vinyl aromatic monomer. This method, introducing a tapered block in the multicomponent copolymer to balance the mechanical properties of the one-component copolymer, simplifies the process but results in a deterioration of the properties.

SUMMARY OF THE INVENTION

It is therefore an object of the present invention to prepare a transparent block copolymer resin that solves the problems with the prior art such as complicated process and unbalanced properties, and to provide a method for preparing a transparent block copolymer resin that includes using a multifunctional compound with only one charge of an initiator to introduce a terminal mikto block having a combined linear and nonlinear (i.e., combined linear, branched and radial) structure and then coupling the mikto block with a multifunctional coupling agent, thereby simplifying the synthesis process, enhancing mechanical properties such as rigidity, flexibility or strength, while maintaining toughness, and securing enhanced processability.

It is another object of the present invention to provide a block copolymer having various structures and compositions that is prepared by anionic polymerization using an alkyl lithium initiator to introduce a terminal mikto block including combined linear and nonlinear blocks.

It is further another object of the present invention to provide a bubble pack including transparent bottles prepared from the block copolymer.

To achieve the above objects of the present invention, there is provided novel methods for preparing a transparent block copolymer resin that includes polymerizing under solution polymerization conditions at least one vinyl aromatic monomer and at least one conjugated diene monomer in a ratio of 55 to 95 weight % vinyl aromatic monomer and 45 to 5 weight % conjugated diene monomer, wherein the polymerizing is conducted using a charge sequence of the following orders.

A first method of the present invention includes sequential following order:
 (a) a vinyl aromatic monomer, a polar organic compound, a polymerization solvent and an anionic initiator to prepare an anionic polymer block;
 (b) a multifunctional compound and a conjugated diene monomer being added to the anionic polymer block to prepare a mikto block of polymer having a combined linear and nonlinear structure block;
 (c) a conjugated diene monomer;
 (d) a vinyl aromatic monomer; and
 (e) a multifunctional coupling agent.

A second method of the present invention includes sequential following order:
 (a) a vinyl aromatic monomer, a polar organic compound, a polymerization solvent and an anionic initiator to prepare an anionic polymer block;
 (b) a multifunctional compound and a conjugated diene monomer being added to the anionic polymer block to prepare a mikto block of polymer having a combined linear and nonlinear structure;
 (c) a conjugated diene monomer and a vinyl aromatic monomer being added in a simultaneous or instantaneously sequential manner; and
 (d) a multifunctional coupling agent.

A third method of the present invention includes sequential following order:
 (a) a vinyl aromatic monomer, a polar organic compound, a polymerization solvent and an anionic initiator to prepare an anionic polymer block;
 (b) a multifunctional compound and a conjugated diene monomer being added to the anionic polymer block to prepare a mikto block of polymer having a combined linear and nonlinear structure;
 (c) a conjugated diene monomer and a vinyl aromatic monomer being added in a simultaneous or instantaneously sequential manner;

(d) a conjugated diene monomer and a vinyl aromatic monomer being added in a simultaneous or instantaneously sequential manner; and (e) a multifunctional coupling agent.

A fourth method of the present invention includes sequential following order:

(a) a vinyl aromatic monomer, a polar organic compound, a polymerization solvent and an anionic initiator to prepare an anionic polymer block;

(b) a multifunctional compound and a conjugated diene monomer being added to the anionic polymer block to prepare a mikto block of polymer having a combined linear and nonlinear structure;

(c) a conjugated diene monomer;

(d) a vinyl aromatic monomer;

(e) a conjugated diene monomer;

(f) a vinyl aromatic monomer; and (g) a multifunctional coupling agent.

A fifth method of the present invention includes sequential following order:

(a) a vinyl aromatic monomer, a polar organic compound, a polymerization solvent and an anionic initiator to prepare an anionic polymer block;

(b) a multifunctional compound and a conjugated diene monomer being added to the anionic polymer block to prepare a mikto block of polymer having a combined linear and nonlinear structure;

(c) a conjugated diene monomer and a vinyl aromatic monomer being added in a simultaneous or instantaneously sequential manner;

(d) a vinyl aromatic monomer; and (e) a multifunctional coupling agent.

A sixth method of the present invention includes sequential following order:

(a) a vinyl aromatic monomer, a polar organic compound, a polymerization solvent and an anionic initiator to prepare an anionic polymer block;

(b) a multifunctional compound and a conjugated diene monomer being added to the anionic polymer block to prepare a mikto block of polymer having a combined linear and nonlinear structure;

(c) a conjugated diene monomer;

(d) a vinyl aromatic monomer;

(e) a conjugated diene monomer and a vinyl aromatic monomer being added in a simultaneous or instantaneously sequential manner; and (f) a multifunctional coupling agent.

Meanwhile, the present invention relates to transparent block copolymers prepared by the first to sixth methods, respectively.

The present invention relates to bubble packs formed from the copolymers prepared by the first to sixth methods, respectively.

Now, the present invention will be described in detail as follows.

The term "mikto block" as used herein refers to a block having a combined linear and nonlinear (i.e., combined linear, branched and radial) structure. In the present invention, a proper multifunctional compound is used to produce terminal mikto blocks of different types, sizes and architectures. The conditions of this preparation determine the type of the blocks included in the mikto block and hence the architecture and composition of the final block copolymer containing the mikto block. Namely, the mikto block formed with the multifunctional compound contains blocks of different polymer chain architectures, such as linear, branched, radial or star-like structures. The present invention intends to specially control the preparation conditions and to selectively prepare some polymer phases.

The present invention is directed to a method for preparing a novel block copolymer resin having such a mikto block synthesized in the above-mentioned specially controlled conditions and thereby showing enhanced processability and mechanical properties, such as rigidity, flexibility and strength, while maintaining toughness.

Now, a description will be given to a process for preparing a mikto block that is commonly performed in the preparation of the transparent block copolymer resin of the present invention.

In the first to sixth methods, the block obtained in the steps (a) and (b) is a mikto block having a combined linear and nonlinear structure as represented by the following formula 1:

$$SnD^{-+}Li \qquad \text{Formula 1}$$

wherein S is a polymer of a vinyl aromatic monomer;

D is a multifunctional compound;

$SnD^-$ is an active polymer mikto block formed by reacting the polymer block of the vinyl aromatic monomer with the multifunctional compound;

n is an integer of 1 to 4 and represents the number of polymer mikto blocks of the vinyl aromatic monomer formed by the multifunctional compound; and $^+Li$ is a metal counter ion of the active polymer mikto block.

The vinyl aromatic monomer as used in the synthesis process of the mikto block may contain 8 to 12 carbon atoms and specifically include, for example, styrene, a-methylstyrene, o-vinylstyrene, p-vinylstyrene, p-tert-butylstyrene, 4-ethylstyrene, 3-ethylstyrene, 4-tert-butylstyrene, 2,4-dimethylstyrene, or mixtures thereof. The most preferred vinyl aromatic monomer is styrene.

The conjugated diene monomer as used herein may contain 4 to 6 carbon atoms and include, for example, 1,3-butadiene, 2-methyl-1,3-butadiene.(i.e., isoprene), 2-ethyl-1,3-butadiene, 2,3-dimethyl-1,3-butadiene, or mixtures thereof. The preferred conjugated diene monomers are 1,3-butadiene and 2-methyl-1,3-butadiene.

An anionic initiator that can be used for anionic polymerization of the vinyl aromatic monomer is preferably an optional organic lithium initiator represented by RM (where R is $C_4$ to $C_8$ alkyl or cycloalkyl; and M is an alkali metal). Namely, the organic lithium initiator may be any initiator commonly used for anionic polymerization and is preferably n-butyl lithium or sec-butyl lithium.

Following the addition of the initiator to start the reaction, a multifunctional compound is added. The multifunctional compound is a multifunctional vinyl aromatic compound, which is not used alone but in combination with the conjugated diene monomer. Specific examples of the multifunctional vinyl aromatic compound may include divinylbenzene, 1,2,4-trivinylbenzene, 1,3-divinylnaphthalene, 1,3,5-trivinylnaphthalene, 2,4divinylbiphenylparadiisopropenylbenzene, or mixtures thereof. The most preferred multifunctional vinyl aromatic compound is divinylbenzene. The preferred conjugated diene monomers as used in combination with the multifuictional vinyl aromatic compound are 1,3-butadiene or 2-methyl-1,3-butadiene.

The weight average molecular weight of the polymer S of the vinyl aromnatic monomer is preferably in the range of at least 500 to 1,000,000, more preferably 10,000 to 500,000, and most preferably 10,000 to 200,000.

The nonlinear polymer (i.e., having a combined linear, branched and radial structure) SnD formed by the multifunctional compound has a weight average molecular weight of at lest 2,000 to 2,000,000, more preferably 20,000 to 1,000,000, and most preferably 30,000 to 500,000, and a molecular weight distribution of at least 1.05 to 2, more preferably 1.05 to 1.5, and most preferably 1.05 to 1.3.

The number average branches n of the nonlinear polymer SnD (i.e., having a combined linear, branched and radial structure) is preferably in the range of 2 to 10, more preferably 2 to 6, and most preferably 2 to 4.

When n is 2 to 4, the polymer $S_2D$ of a linear chain structure that has two polymers of the vinyl aromatic monomer or the conjugated diene monomer are bonded to the multifunctional vinyl aromatic compound is present in an amount of, based on the total weight of the combined (i.e., linear and nonlinear) polymers S+SnD, at least 5 to 60 weight %, more preferably 10 to 50 weight %, and most preferably 15 to 40 weight %; and the polymer $S_{3-4}D$ of a branched or higher structure is present in an amount of, based on the total weight of the mixed polymers S+SnD, at least 1 to 50 wt. %, more preferably 3 to 40 wt. %, and most preferably 5 to 30 wt. %.

The method for preparing a copolymer having a combined linear and nonlinear (i.e., combined linear, branched and radial) structure using an anionic initiator, a vinyl aromatic monomer or a conjugated diene monomer, and a multifunctional compound includes sequential order:

a multifunctional compound includes sequential following order:

(a) a vinyl aromatic monomer, a polar organic compound, a polymerization solvent and an anionic initiator to prepare an anionic polymer; and (b) a multifunctional compound and a conjugated diene monomer being added to the anionic polymer to prepare an active polymer having a combined linear and nonlinear structure.

In the step (a), the polymer of the vinyl aromatic monomer is prepared The anionic initiator can be used before or after the addition of the vinyl aromatic monomer, and is preferably used after the addition of the vinyl aromatic monomer. The nolar organic compound is preferably used before the addition of the initiator.

In the step (b), the polymer of the vinyl aromatic monomer is converted to a mixture of a linear polymer not participating in the bonding with the multifunctional compound and a nonlinear (i.e., combined linear, branched an radial) polymer participating in the bonding with the multifunctional compound. To the polymer of the step (a), the multifunctional compound and the conjugated diene monomer are added in combination, or individually in a simultaneous or sequential manner.

The phm ratio of the multifunctional compound with respect to the initiator is preferably in the range of 0.05 to 10, more preferably 0.2 to 3, and most preferably 0.3 to 1.5.

The phm ratio of the conjugated diene monomer with respect to the initiator is preferably in the range of 0.1 to 30, more preferably 0.2 to 15, and most preferably 0.5 to 10.

Preferably, the multifunctional compound in the step (b) is diluted with the conjugated diene monomer prior to being added. Namely, the multifunctional compound and the conjugated diene monomer are mixed together and used in combination. The use of the multifunctional compound as a mixture with the conjugated diene monomer is to control the reactivity of the multifunctional compound to some degree.

More specifically, using the multifunctional compound in combination with the conjugated diene monomer has some effects as follows.

First, the multifunctional compound can be used as diluted with the conjugated diene monomer and thereby considerably reduce the coupling reaction between the multifunctional compound molecules caused by high concentration. Second, the reaction rate difference due to the simultaneous use of the multifunctional compound and the conjugated diene monomer suppresses the indiscriminate coupling reaction of the multifunctional compound.

Namely, the rate of adding the conjugated diene monomer to the terminal of the polymer of the leaving vinyl aromatic monomer or the leaving conjugated diene monomer is faster than that of adding the vinyl aromatic monomer in the anionic polymerization using an organic metal initiator in a non-polar solvent. Thus when the multifunctional compound, which is multifunctional but a sort of the vinyl aromatic monomer, and the conjugated diene monomer are added to the terminal of the leaving polymer simultaneously, the conjugated diene monomer is added to the terminal of the leaving polymer to form the terminal of the leaving polymer of the conjugated diene monomer. In this case, as the concentration of the conjugated diene monomer in the polymerization solution decreases due to the addition of the conjugated diene monomer to the leaving polymer, the rate of adding the multifunctional vinyl aromatic compound to the leaving polymer becomes faster.

Nevertheless, the terminal of the leaving polymer of the conjugated diene monomer still remains to inhibit the formation of a high-molecular-weight polymer resulting from the indiscriminate coupling reaction of the multifunctional compound. As the concentration of the conjugated diene monomer nearly decreases, the coupling reaction of the multifunctional compound may occur but the yield of the reaction product is insignificant because a considerable amount of the multifunctional compound is already used up in the reaction.

Alternatively, the multifunctional compound may be used in combination with a vinyl aromatic monomer instead of a conjugated diene monomer, in which case the effects of such a combined use are almost the same as those in the case of using the multifunctional compound in combination with a conjugated diene monomer but the second one of the above-mentioned effects may appear insignificantly. Of course, the combined use of the vinyl aromatic monomer cannot be excluded. The amount of the multifunctional compound used in combination with the vinyl aromatic monomer is the same as that when used in combination with the conjugated diene monomer.

Any polymerization solvent commonly used for anionic polymerization can be used as the inert hydrocarbon solvent for polymerization reaction. Specific example of the solvent as used herein may include pentane, hexane, octane, cyclohexane, or mixtures thereof. Among these solvents, cyclohexane is preferred.

To improve the effect of the organic lithium initiator, a polar organic compound is required in the hydrocarbon solvent. Specific examples of the polar organic compound may include ethers, thio-ethers, tertiary amines, or mixtures thereof. The most preferable polar organic compound is tetrahydrofuran.

The reaction temperature is in the range of −10 to 150° C., preferably 10 to 110° C.

The reaction is performed with a pressure high enough to maintain the liquid state of the reaction mixture.

Subsequently, the activated mikto polymer block is polymerized by the first to sixth methods to yield the present invention copolymers including a mikto block.

Now, the first to sixth methods will be described in further detail as follows.

Specific examples of the multifunctional coupling agent as used in the preparation of copolymers may include multifunctional conjugated vinyl monomers, epoxydized hydrocarbon polymers, organoalkyl phosphites, arylalkyl phosphites, multifunctional isocyanates, multifunctional imines, multifunctional aldehydes, multifunctional halides, metal-multifunctional halides, and so forth. Multifunctional coupling agents as used herein are epoxydized vegetable oils, including epoxydized soybean oil, epoxydized linsed oil, or mixtures thereof. The most suitable coupling agent is epoxydized vegetable oil, for example, epoxydized soybean oil.

The polymerization reaction is performed in the inert atmosphere destitute of oxygen or water. Before a treatment for terminating the polymerization reaction, the terminal of the individual polymer chain is leaving. Impurities such as water or alcohol reduce the amount of leaving polymers in the reaction mixture.

Any known polymerization solvent for anionic polymerization can be used as the inert hydrocarbon solvent for polymerization reaction and may include, for example, pentane, hexane, octane, cyclohexane, or mixtures thereof. Among these solvents, cyclohexane is preferred.

The reaction temperature is in the range of −10 to 150° C., preferably 10 to 110° C. Polymerization is performed with the pressure high enough to maintain the reaction mixture in the liquid state.

Charge Sequence of First Method
(a) a vinyl aromatic monomer, a polar organic compound, a polymerization solvent and an anionic initiator;
(b) a mixture of a multifunctional compound and a conjugated diene compound;
(c) a conjugated diene monomer;
(e) a multifunctional coupling agent.

Charge Sequence of Second Method
(a) a vinyl aromatic monomer, a polar organic compound, a polymerization solvent and an anionic initiator;
(b) a mixture of a multifunctional compound and a conjugated diene compound;
(c) a mixture of a conjugated diene monomer and a vinyl aromatic monomer; and
(d) a multifunctional coupling agent.

Charge Sequence of Third Method
(a) a vinyl aromatic monomer, a polar organic compound, a polymerization solvent and an anionic initiator;
(b) a mixture of a multifunctional compound and a conjugated diene compound;
(c) a mixture of a conjugated diene monomer and a vinyl aromatic monomer;
(d) a mixture of a conjugated diene monomer and a vinyl aromatic monomer; and
(e) a multifunctional coupling agent.

Charge Sequence of Fourth Method
(a) a vinyl aromatic monomer, a polar organic compound, a polymerization solvent and an anionic initiator;
(b) a mixture of a multifunctional compound and a conjugated diene compound;
(c) a conjugated diene monomer;
(d) a vinyl aromatic monomer;
(e) a conjugated diene monomer;
(f) a vinyl aromatic monomer; and
(g) a multifunctional coupling agent.

Charge Sequence of Fifth Method
(a) a vinyl aromatic monomer, a polar organic compound, a polymerization solvent and an initiator;
(b) a mixture of a multifunctional compound and a conjugated diene compound;
(c) a mixture of a conjugated diene monomer and a vinyl aromatic monomer;
(d) a conjugated diene monomer;
(e) a vinyl aromatic monomer; and
(f) a multifunctional coupling agent.

Charge Sequence of sixth method
(a) a vinyl aromatic monomer, a polar organic compound, a polymerization solvent and an initiator;
(b) a mixture of a multifunctional compound and a conjugated diene compound;
(c) a conjugated diene monomer;
(d) a vinyl aromatic monomer;
(e) a mixture of a conjugated diene monomer and a vinyl aromatic monomer; and
(f) a multifunctional coupling agent.

In the first to sixth methods, the conjugated diene monomer and the vinyl aromatic monomer may be added in combination or individually in a simultaneous or instantaneously sequential manner.

The respective copolymers prepared by the first to sixth methods prior to the addition of the coupling agent are represented as follows:

First Method
$(S1)^1$-B1-S2-Li
$(S1)^2$-B1-S2-Li
$(S1)^3$-B1-S2-Li
$(S1)^n$-B1-S2-Li Second Method
$(S1)^1$-B1/S2-Li
$(S1)^2$-B1/S2-Li
$(S1)^3$-B1/S2-Li
$(S1)^n$-B1/S2-Li Third Method
$(S1)^1$-B1/S2-B2/S3-Li
$(S1)^2$-B1/S2-B2/S3-Li
$(S1)^3$-B1/S2-B2/S3-Li
$(S1)^n$-B1/S2-B2/S3-Li Fourth Method
$(S1)^1$-B1-S2-B2-S3-Li
$(S1)^2$-B1-S2-B2-S3-Li
$(S1)^3$-B1-S2-B2-S3-Li
$(S1)^n$-B1-S2-B2-S3-Li Fifth Method
$(S1)^1$-B1/S2-B2-S3-Li
$(S1)^2$-B1/S2-B2-S3-Li
$(S1)^3$-B1/S2-B2-S3-Li
$(S1)^n$-B1/S2-B2-S3-Li Sixth Method
$(S1)^1$-B1-S2-B2/S3-Li
$(S1)^2$-B1-S2-B2/S3-Li
$(S1)^3$-B1-S2-B2/S3-Li
$(S1)^n$-B1-S2-B2/S3-Li Here, S is a polymer block of the vinyl aromatic monomer; B is a polymer block of the conjugated diene monomer; B/S is a tapered polymer block of the conjugated diene monomer and vinyl aromatic monomer with a structure that S increases with an increase in the distance from B; S with a superior figure is a mikto polymer block of the vinyl aromatic monomer formed by a multifunctional compound, where the superior figure represents the number of polymer blocks of the vinyl aromatic monomer bonded to the multifunctional compound, and n as the superior figure represents that the number of polymer blocks of the vinyl aromatic monomer bonded to the multifunctional compound is greater than 3; and Li is the residue of the anionic initiator, i.e., the counter ion of an active anion.

The block copolymers thus obtained by the methods comprises, based on the total weight of the monomers added during polymerization, 55 to 95 wt. %, more preferably 70 to 80 wt. % of the vinyl aromatic monomer, and 45 to 5 wt. %, more preferably 30 to 20 wt. % of the conjugated diene monomer.

The charging sequence and the range of charge contents in the preparation of the transparent block copolymer of the present invention according to the first to sixth methods can be summarized as Tables 1 to 6.

TABLE 1

First method

| Step | Ingredient | Wide range | Preferred range | Most Preferred range |
|---|---|---|---|---|
| (a) | Polar organic compound | 0.001~0.15 | 0.01~0.14 | 0.05~0.13 |
|  | Anionic initiator | 0.005~0.4 | 0.11~0.3 | 0.16~0.24 |
|  | Vinyl aromatic monomer | 35~55 | 40~50 | 43~47 |
| (b) | Multifunctional compound | 0.00025~4 | 0.022~0.9 | 0.048~0.36 |
|  | Conjugated diene monomer | 0.1~30 | 0.2~15 | 0.5~10 |
| (c) | Conjugated diene monomer | 5~45 | 15~35 | 20~30 |
| (d) | Vinyl aromatic monomer | 20~40 | 25~35 | 27~33 |
| (e) | Multifunctional Coupling agent | 0.005~1.0 | 0.15~0.55 | 0.35~0.47 |

In the first method, the monomers and the initiator are preferably diluted prior to being used, or added in the presence of a sufficient solvent in order to prevent overheated reactions.

When using at least one monomer, the monomers are added in combination or individually in a simultaneous or sequential manner. For sequential additions, the intervals can be controlled to add the monomers fast or slowly. In the step (a), the polar organic compound may be diluted with a solvent, or separately added.

The range of charge contents is measured in parts by weight based on 100 parts by weight of the entire monomers (in phm).

In the step (b) of preparing a mikto block, the multifunctional compound and the conjugated diene monomer may be added in combination or individually in a simultaneous or sequential manner. For sequential additions, the intervals can be controlled to add the monomers fast or slowly.

TABLE 2

Second method

| Step | Ingredient | Wide range | Preferred range | Most Preferred range |
|---|---|---|---|---|
| (a) | Polar organic compound | 0.001~0.15 | 0.01~0.14 | 0.05~0.13 |
|  | Anionic initiator | 0.005~0.35 | 0.1~0.3 | 0.15~0.22 |
|  | Vinyl aromatic monomer | 32~52 | 37~47 | 40~44 |
| (b) | Multifunctional compound | 0.00025~3.5 | 0.02~0.9 | 0.045~0.33 |
|  | Conjugated diene monomer | 0.1~30 | 0.2~15 | 0.5~10 |
| (c) | Conjugated diene monomer | 5~45 | 15~35 | 20~30 |
|  | Vinyl aromatic monomer | 23~43 | 28~38 | 30~36 |
| (d) | Multifunctional Coupling agent | 0.005~1.0 | 0.1~0.5 | 0.33~0.44 |

In the second method, the monomers and the initiator are preferably diluted prior to being used, or added in the presence of a sufficient solvent in order to prevent overheated reactions.

When using at least one monomer, the monomers are added in combination or individually in a simultaneous or sequential manner. For sequential additions, the intervals can be controlled to add the monomers fast or slowly. In the step (a), the polar organic compound may be diluted with a solvent, or separately added.

The range of charge contents is measured in parts by weight based on 100 parts by weight of the entire monomers (in phm).

In the step (b) of preparing a mikto block, the multifunctional compound and the conjugated diene monomer may be added in combination or individually in a simultaneous or sequential manner. For sequential additions, the intervals can be controlled to add the monomers fast or slowly.

TABLE 3

Third method

| Step | Ingredient | Wide range | Preferred range | Most Preferred range |
|---|---|---|---|---|
| (a) | Polar organic compound | 0.001~0.15 | 0.01~0.14 | 0.05~0.13 |
|  | Anionic initiator | 0.005~0.25 | 0.07~0.2 | 0.09~0.13 |
|  | Vinyl aromatic monomer | 19~31 | 20~30 | 24~26 |
| (b) | Multifunctional compound | 0.00025~2.5 | 0.014~0.6 | 0.027~0.195 |
|  | Conjugated diene monomer | 0.1~30 | 0.2~15 | 0.5~10 |
| (c) | Conjugated diene monomer | 3~23 | 8~18 | 11~15 |
|  | Vinyl aromatic monomer | 18~32 | 20~30 | 23~27 |
| (d) | Conjugated diene monomer | 2~22 | 7~17 | 9~15 |
|  | Vinyl aromatic monomer | 18~32 | 20~30 | 23~27 |
| (e) | Multifunctional Coupling agent | 0.005~1.0 | 0.1~0.4 | 0.2~0.26 |

In the third method, the monomers and the initiator are preferably diluted prior to being used, or added in the presence of a sufficient solvent in order to prevent overheated reactions.

When using at least one monomer, the monomers are added in combination or individually in a simultaneous or sequential manner. For sequential additions, the intervals can be controlled to add the monomers fast or slowly. In the step (a), the polar organic compound may be diluted with a solvent, or separately added.

The range of charge contents is measured in parts by weight based on 100 parts by weight of the entire monomers (in phm).

In the step (b) of preparing a mikto block, the multifunctional compound and the conjugated diene monomer may be added in combination or individually in a simultaneous or sequential manner. For sequential additions, the intervals can be controlled to add the monomers fast or slowly.

TABLE 4

Fourth method

| Step | Ingredient | Wide range | Preferred range | Most Preferred range |
|---|---|---|---|---|
| (a) | Polar organic compound | 0.001~0.15 | 0.01~0.14 | 0.05~0.13 |
|  | Anionic initiator | 0.005~0.25 | 0.08~0.2 | 0.11~0.16 |
|  | Vinyl aromatic monomer | 24~36 | 25~35 | 29~31 |
| (b) | Multifunctional compound | 0.00025~2.5 | 0.016~0.6 | 0.033~0.24 |
|  | Conjugated diene monomer | 0.1~30 | 0.2~15 | 0.5~10 |
| (c) | Conjugated diene monomer | 3~23 | 8~18 | 11~15 |
| (d) | Vinyl aromatic monomer | 15~29 | 17~27 | 20~24 |
| (e) | Conjugated diene monomer | 2~22 | 7~17 | 9~15 |
| (f) | Vinyl aromatic monomer | 16~30 | 18~28 | 21~25 |
| (g) | Multifunctional Coupling agent | 0.005~1.0 | 0.1~0.4 | 0.23~0.31 |

In the fourth method, the monomers and the initiator are preferably diluted prior to being used, or added in the presence of a sufficient solvent in order to prevent overheated reactions.

When using at least one monomer, the monomers are added in combination or individually in a simultaneous or sequential manner. For sequential additions, the intervals can be controlled to add the monomers fast or slowly. In the step (a), the polar organic compound may be diluted with a solvent, or separately added.

The range of charge contents is measured in parts by weight based on 100 parts by weight of the entire monomers.

In the step (b) of preparing a mikto block, the multifunctional compound and the conjugated diene monomer may be added in combination or individually in a simultaneous or sequential manner. For sequential additions, the intervals can be controlled to add the monomers fast or slowly.

TABLE 5

Fifth method

| Step | Ingredient | Wide range | Preferred range | Most Preferred range |
|---|---|---|---|---|
| (a) | Polar organic compound | 0.001~0.15 | 0.01~0.14 | 0.05~0.13 |
|  | Anionic initiator | 0.005~0.25 | 0.08~0.2 | 0.1~0.15 |
|  | Vinyl aromatic monomer | 22~34 | 23~33 | 26~30 |
| (b) | Multifunctional compound | 0.00025~2.5 | 0.016~0.6 | 0.03~0.225 |
|  | Conjugated diene monomer | 0.1~30 | 0.2~15 | 0.5~10 |
| (c) | Conjugated diene monomer | 4~24 | 9~19 | 12~16 |
|  | Vinyl aromatic monomer | 18~32 | 20~30 | 24~26 |
| (d) | Conjugated diene monomer | 1~21 | 6~16 | 8~14 |
| (e) | Vinyl aromatic monomer | 15~29 | 17~27 | 20~24 |
| (f) | Multifunctional Coupling agent | 0.005~1.0 | 0.1~0.4 | 0.21~0.29 |

In the fifth method, the monomers and the initiator are preferably diluted prior to being used, or added in the presence of a sufficient solvent in order to prevent overheated reactions.

When using at least one monomer, the monomers are added in combination or individually in a simultaneous or sequential manner. For sequential additions, the intervals can be controlled to add the monomers fast or slowly. In the step (a), the polar organic compound may be diluted with a solvent, or separately added.

The range of charge contents is measured in parts by weight based on 100 parts by weight of the entire monomers.

In the step (b) of preparing a mikto block, the multifunctional compound and the conjugated diene monomer may be added in combination or individually in a simultaneous or sequential manner. For sequential additions, the intervals, can be controlled to add the monomers fast or slowly.

TABLE 6

Sixth method

| Step | Ingredient | Wide range | Preferred range | Most Preferred range |
|---|---|---|---|---|
| (a) | Polar organic compound | 0.001–0.15 | 0.01–0.14 | 0.05–0.13 |
|  | Anionic initiator | 0.005–0.25 | 0.08–0.2 | 0.1–0.15 |
|  | Vinyl aromatic monomer | 22–34 | 23–33 | 26–30 |
| (b) | Multifunctional compound | 0.00025–2.5 | 0.016–0.6 | 0.03–0.225 |
|  | Conjugated diene monomer | 0.1–30 | 0.2–15 | 0.5–10 |
| (c) | Conjugated diene monomer | 1–21 | 6–16 | 8–14 |
| (d) | Vinyl aromatic monomer | 15–29 | 17–27 | 20–24 |
| (e) | Conjugated diene monomer | 4–24 | 9–19 | 12–16 |

TABLE 6-continued

Sixth method

| Step | Ingredient | Wide range | Preferred range | Most Preferred range |
|---|---|---|---|---|
| | Vinyl aromatic monomer | 18–32 | 20–30 | 24–26 |
| (f) | Multifunctional Coupling agent | 0.005–1.0 | 0.1–0.4 | 0.21–0.29 |

In the sixth method, the monomers and the initiator are preferably diluted prior to being used, or added in the presence of a sufficient solvent in order to prevent overheated reactions.

When using at least one monomer, the monomers are added in combination or individually in a simultaneous or sequential manner. For sequential additions, the intervals can be controlled to add the monomers fast or slowly. In the step (a), the polar organic compound may be diluted with a solvent, or separately added.

The range of charge contents is measured in parts by weight based on 100 parts by weight of the entire monomers.

In the step (b) of preparing a mikto block, the multifunctional compound and the conjugated diene monomer may be added in combination or individually in a simultaneous or sequential manner. For sequential additions, the intervals can be controlled to add the monomers fast or slowly.

The final polymers prepared by the six methods as listed in Tables 1 to 6 are a multi-component polymer having a mikto block of the vinyl aromatic polymer associated with the polymer of at least one vinyl aromatic monomer and at least one coupled polymer formed by the multifunctional coupling agent.

After the completion of the polymerization reaction, as well known, the reaction mixture is treated with water, alcohol, phenol or an active hydrogen compound such as dicarboxylic acid to convert the carbon-lithium bond of the active polymer to a carbon-hydrogen bond and to isolate the resultant polymer. The most preferred polymerization terminator is water and carbon dioxide. The polymer with the polymerization terminator is treated with an antioxidant and then removed of the solvent through vaporization using a vacuum oven or a devolatilization extruder. The solid polymer removed of the solvent is measured in regard to different properties. The molecular weight is determined by Gel Permeation Chromatography(GPC).

For GPC, a Waters-2690 body (including pump, injector and column box), a Waters 410 Differential refractometer as a detector, and HR5E-HR4-HR4-HR2 (Waters) as serial columns are used. Tetrahydrofuran is used as a solvent for GPC to measure the molecular weight of the polymer with a flux of 0.3 ml/min at below 41° C. for 60 minutes per sample.

A sample for measurement of mechanical properties is obtained by injection molding. Table 7 lists the property measurement standards.

TABLE 7

| Property | Standards |
|---|---|
| Tensile strength | ASTM D638 |
| Bending strength | ASTM D790 |
| Impact strength | ASTM D256 |
| Hardness | ASTM D785 |
| Melt index | ASTM D1238 |

The polymer resin is useful for molding products, films and sheet materials, and generally admixed with various additives such as a releasing agent prior to the processing.

DETAILED DESCRIPTION OF THE INVENTION

Hereinafter, the present invention will be described in detail by way of the following examples, which are not intended to limit the scope of the present invention.

In the examples of the present invention, styrene and butadiene were used as monomers and the end of polymer before a coupling reaction was a polystyrene block that included a tapered block or not. A polar organic compound was used to control the size of the tapered block and enhance the reactivity of an initiator. Besides, there were used n-butyl lithium as an initiator, divinylbenzene as a multifunctional compound and epoxydized soybean oil as a coupling agent.

EXAMPLE 1

This example is intended to explain a method for preparing a mikto polystyrene block having different structures, for example, linear, branched or radial, and hence different sizes.

Cyclohexane, styrene, divinylbenzene and 1,3-butadiene additionally mixed with the multifunctional compound were purified through an activated alumina column to guarantee a sufficient progress of anionic polymerization, in which n-butyl lithium was used as an anionic initiator and a polar organic compound, tetrahydrofuran was used as an initiator activator.

Polymerization was performed with a 5L stainless steel reactor equipped with a jacket and capable of stirring in the nitrogen atmosphere. During the polymerization reaction, anhydrous reactants were continuously stirred. Cyclohexane separately treated with tetrahydrofuran was preheated to 60° C. and then added to the reactor, n-butyl lithium used as the initiator was 2 M in hexane. Methanol was used as a reaction terminator.

First, to prepare a polystyrene block, a styrene monomer was added to the reactor and treated with an initiator for sufficient conversion to polymers. Subsequently, divinylbenzene previously diluted with 1,3-butadiene was added to the reactor to convert the polystyrene block to a mikto polystyrene block. In other words, the reaction of the polystyrene block with divinylbenzene resulted in a block having a combined linear and nonlinear structure.

Namely, the mikto polystyrene block was prepared in three steps. After production of the polystyrene block in the first step, divinylbenzene was used to prepare a combined linear, branched and radial polystyrene block in the second step. Here, divinylbenzene was previously diluted with the conjugated diene monomer, 1,3-butadiene. Namely, divinylbenzene was used as a mixture with 1,3-butadiene. In the third step, the reaction was terminated.

Following the addition of divinylbenzene, samples were collected by reaction time and subjected to GPC to monitor the process of producing a mikto polystyrene block. The progress of reaction and the added amount of the individual ingredients are presented in Table 8. The results are summarized in Table 9.

TABLE 8

| | Ingredient | Run 1 | Run 2 |
|---|---|---|---|
| Step 1 | Cyclohexane (phm) | 1034 | 1034 |
| | Tetrahydrofuran (phm) | 0.217 | 0.215 |
| | n-butyl lithium initiator (phm) | 0.406 | 0.429 |
| | Styrene (phm) | 93.1 | 93.1 |
| | Reaction time (min) | 12 | 12 |
| | Highest reaction temperature (° C.) | 82.1 | 78.6 |
| | Mn | 14300 | 3900 |
| | MWD | 1.05 | 1.05 |
| Step 2 | Divinyl benzene (phm) | 0.505 | 0.281 |
| | 1,3-butadiene (phm) | 6.9 | 6.9 |
| | Reaction time (min) | 60 | 60 |
| | Highest reaction temperature (° C.) | 66.5 | 65.4 |
| | Mn | 23800 | 20100 |
| | MWD | 1.31 | 1.19 |
| Step 3 | Methanol (phm) | 0.20 | 0.21 |

Note
Mn Number average molecular weight
MWD Molecular weight distribution

TABLE 9

| | Run 1 DVB/NBL (phm/phm) 1.244 | | | | | | Run 2 DVB/NBL (phm/phm) 0.655 | | | | | |
|---|---|---|---|---|---|---|---|---|---|---|---|---|
| Reaction Time (min) | 0 | 5 | 10 | 20 | 40 | 60 | 0 | 5 | 10 | 20 | 40 | 60 |
| Nm, (/1000) | 14.7 | 17.3 | 20.3 | 21.3 | 23.2 | 23.8 | 13.9 | 15.9 | 17.1 | 18.1 | 19.6 | 20.1 |
| MWD | 1.05 | 1.15 | 1.20 | 1.24 | 1.28 | 1.31 | 1.05 | 1.08 | 1.10 | 1.15 | 1.18 | 1.19 |
| SSS+[1] content (%) | 0 | 2.9 | 7.1 | 10.7 | 15.6 | 18.9 | 0 | 0.6 | 1.6 | 4.6 | 6.2 | 7.2 |
| SS[2] content (%) | 0 | 15.5 | 24.5 | 28.3 | 30.9 | 30.5 | 0 | 7.8 | 11.8 | 17.1 | 19.6 | 20.6 |
| S[3] content (%) | 100 | 81.6 | 68.4 | 61.0 | 53.5 | 50.6 | 100 | 91.6 | 86.6 | 78.3 | 74.2 | 72.2 |
| AN of SSS+[4] | — | 3.27 | 3.29 | 3.38 | 3.45 | 3.52 | — | 3.25 | 3.11 | 3.21 | 3.24 | 3.29 |

Note
[1] SSS+ coupled polystyrene block having a branched or higher structure.
[2] SS coupled polystyrene block having a linear structure.
[3] S polystyrene block not coupled together by divinylbenzene.
[4] AN arm number = (Mn of SSS+)/(Mn of S)
DVB divinylbenzene,
NBL n-butyl lithium
Mn Number average molecular weight,
MWD Molecular weight distribution As seen from the results of Table 9, the contents(SS and SSS+) of mikto blocks having a linear or higher structure by divinylbenzene after 60 minutes of reaction in Run 1 and Run 2 were 49.4% and 27.8%, respectively.

For the composition of the mikto polystyrene blocks after 60 minutes hour of reaction in Run 1 and Run 2, the linear block (SS) contents were 30.5% and 20.6%, respectively, and the branched (including radial) block (SSS+) contents were 18.9% and 7.2%, respectively.

EXAMPLE 2

This example is intended to explain a method for preparing a multi-component copolymer having a mikto block of vinyl aromatic polymer coupled with the polymer of at least one vinyl aromatic monomer, and having at least one coupled polymer with a coupling agent.

This example discloses the first method of the present invention to prepare a multi-component copolymer containing a mikto polystyrene block without a tapered block.

Polymerization was performed with a 10L stainless steel reactor equipped with a jacket and capable of stirring in the nitrogen atmosphere. During the polymerization reaction, anhydrous reactants were continuously stirred. Cyclohexane separately treated with tetrahydrofuran was preheated to 60° C. and then added to the reactor. n-butyl lithium used as the initiator was 2 M in hexane.

Coupling was performed in the presence of epoxydized vegetable oil (ESO) and, as well known in the art, the reaction was terminated with water and carbon dioxide.

An antioxidant as used herein was a mixture of hindered phenol (pentaerythritol tetrakis(3-(3,5-di-tert-butyl-4-hydroxyphenyl)propionate; Irganox 1010; Ciba-Geigy Co.) and organophosphite (trisnonylphenyl phosphite; TNPP; Ciba-Geigy Co.), which mixture was separately dissolved in cyclohexane and then added to the polymer material.

Following the addition of the individual monomers, the initiator or various additives, the addition line was washed with about 10 to 20 ppm of cyclohexane and purged with nitrogen.

After the completion of the polymerization reaction, the solid phase was isolated from the polymer material and subjected to injection molding.

The total amount of styrene and butadiene monomers was 1,500 g and that of cyclohexane was 4,500 g. The content ratio of styrene to butadiene was 75/25.

The progress of reaction and the added amount of the individual ingredients are presented in Table 10. The results of property measurements are summarized in Table 11.

The mikto polystyrene block of the step 2 was prepared in the same manner as described in Example 1.

TABLE 10

| | Ingredient | Run 1 | Run 2 | Run 3 |
|---|---|---|---|---|
| Step 1 | Cyclohexane (phm) | 300 | 300 | 300 |
| | Tetrahydrofuran (phm) | 0.108 | 0.108 | 0.108 |
| | n-butyl lithium initiator (phm) | 0.195 | 0.182 | 0.177 |
| | Styrene (phm) | 45.00 | 45.00 | 45.00 |
| Step 2 | Divinylbenzene (phm) | 0.160 | 0.107 | 0.120 |
| | 1,3-butadiene (phm) | 2.00 | 2.00 | 2.00 |
| Step 3 | 1,3-butadiene (phm) | | 23.00 | |
| Step 4 | Styrene (phm) | | 30.00 | |
| Step 5 (Coupling) | ESO (phm) | 0.212 | 0.212 | 0.215 |
| Step 6 (Terminating polymerization) | Distilled water (phm) | 0.274 | 0.256 | 0.248 |
| | Carbon dioxide (phm) | 0.602 | 0.564 | 0.457 |
| Step 7 (Stabilizing) | Antioxidant mixture (phm) | | 0.6 | |

TABLE 11

| Property | Run 1 | Run 2 | Run 3 |
|---|---|---|---|
| Molecular weight | | | |
| $S^{(1)}$ (Mn/MWD) | 14800/1.05 | 15800/1.05 | 16300/1.06 |
| $MS^{(2)}$ (Mn/MWD) | 27600/1.3 | 21700/1.18 | 23100/1.22 |
| Final resin (Mw/MWD) | 283000/2.87 | 136000/1.80 | 145000/1.80 |
| Melt index (g/10 min) | 1 | 20 | 10 |
| Tensile strength ($kg_f/cm^2$) | 340 | 308 | 311 |
| Elongation (%) | 187 | 203 | 223 |
| Bending strength ($kg_f/m^2$) | 439 | 411 | 410 |
| Izod impact strength ($kJ/m^2$) | 3.2 | 3.0 | 4.1 |
| Hardness (Shore D) | 59 | 61 | 60 |

Note
[1] A polystyrene block prepared by the initial reaction (Step 1).
[2] A mikto polystyrene block formed by the multifunctional compound (Step 2).

EXAMPLE 3

This example discloses the second method of the present invention to prepare a multi-component copolymer containing a mikto polystyrene block and one tapered block. Polymerization was performed in the same conditions as in Example 2, including reactor, coupling agent, antioxidant, or the like. The mikto polystyrene block in the step 2 was prepared in the same manner as described in Example 1.

The progress of reaction and the added amount of the individual ingredients are presented in Table 12. The results of property measurements are summarized in Table 13.

TABLE 12

| | Ingredient | Run 1 | Run 2 | Run 3 |
|---|---|---|---|---|
| Step 1 | Cyclohexane (phm) | 300 | 300 | 300 |
| | Tetrahydrofuran (phm) | 0.120 | 0.102 | 0.084 |
| | n-butyl lithium initiator (phm) | 0.202 | 0.171 | 0.149 |
| | Styrene (phm) | 45.00 | 45.00 | 45.00 |
| Step 2 | Divinylbenzene (phm) | 0.100 | 0.080 | 0.080 |
| | 1,3-butadiene (phm) | 2.00 | 2.00 | 2.00 |
| Step 3 | 1,3-butadiene (phm) | | 23.00 | |
| | Styrene (phm) | | 30.00 | |
| Step 4 (Coupling) | ESO (phm) | 0.561 | 0.468 | 0.424 |
| Step 5 | Distilled water (phm) | 0.283 | 0.240 | 0.210 |

TABLE 12-continued

| | Ingredient | Run 1 | Run 2 | Run 3 |
|---|---|---|---|---|
| (Terminating polymerization) | Carbon dioxide (phm) | 0.623 | 0.527 | 0.462 |
| Step 6 (Stabilizing) | Antioxidant mixture (phm) | | 0.6 | |

TABLE 13

| Property | Run 1 | Run 2 | Run 3 |
|---|---|---|---|
| Molecular weight | | | |
| $S^{(1)}$ (Mn/MWD) | 14300/1.04 | 16900/1.03 | 19300/1.03 |
| $MS^{(2)}$ (Mn/MWD) | 18100/1.18 | 21100/1.16 | 24600/1.18 |
| Final resin (Mw/MWD) | 125000/1.59 | 150000/1.65 | 174000/1.83 |
| Melt index (g/10 min) | 60 | 12 | 4 |
| Tensile strength ($kg_f/cm^2$) | 245 | 248 | 255 |
| Elongation (%) | 220 | 217 | 210 |
| Bending strength ($kg_f/m^2$) | 325 | 328 | 335 |
| Izod impact strength ($kJ/m^2$) | 3.6 | 4.2 | 3.7 |
| Hardness (Shore D) | 65 | 66 | 68 |

Note
[1] A polystyrene block prepared by the initial reaction (Step 1).
[2] A mikto polystyrene block formed by the multifunctional compound (Step 2).

EXAMPLE 4

This example discloses the third method of the present invention to prepare a multi-component copolymer containing a mikto polystyrene block and two tapered blocks. Polymerization was performed in the same conditions as in Example 2, including reactor, coupling agent, antioxidant, or the like. The mikto polystyrene block in the step 2 was prepared in the same manner as described in Example 1.

The progress of reaction and the added amount of the individual ingredients are presented in Table 14. The results of property measurements are summarized in Table 15.

TABLE 14

| | Ingredient | Run 1 | Run 2 |
|---|---|---|---|
| Step 1 | Cyclohexane (phm) | 300 | 300 |
| | Tetrahydrofuran (phm) | 0.078 | 0.078 |
| | n-butyl lithium initiator (phm) | 0.131 | 0.147 |
| | Styrene (phm) | 29.97 | 29.97 |
| Step 2 | Divinylbenzene (phm) | 0.067 | 0.053 |
| | 1,3-butadiene (phm) | 1.73 | 1.73 |
| Step 3 | 1,3-butadiene (phm) | 11.64 | |
| | Styrene (phm) | 22.51 | |
| Step 4 | 1,3-butadiene (phm) | 11.64 | |
| | Styrene (phm) | 22.51 | |
| Step 5 (Coupling) | ESO (phm) | 0.224 | 0.374 |
| Step 6 (Terminating polymerization) | Distilled water (phm) | 0.185 | 0.206 |
| | Carbon dioxide (phm) | 0.406 | 0.453 |
| Step 7 (Stabilizing) | Antioxidant mixture (phm) | | 0.6 |

TABLE 15

| Property | Run 1 | Run 2 |
|---|---|---|
| Molecular weight | | |

TABLE 15-continued

| Property | Run 1 | Run 2 |
|---|---|---|
| S[(1)] (Mn/MWD) | 14600/1.04 | 13100/1.04 |
| MS[(2)] (Mn/MWD) | 18700/1.17 | 16300/1.15 |
| Final resin (Mw/MWD) | 241000/1.90 | 171000/1.59 |
| Melt index (g/10 min) | 13 | 19 |
| Tensile strength ($kg_f/cm^2$) | 157 | 143 |
| Elongation (%) | 600 | 600 |
| Bending strength ($kg_f/cm^2$) | 194 | 180 |
| Izod Impact strength ($kJ/m^2$) | 6.0 | 4.4 |
| Hardness (Shore D) | 58 | 57 |

Note
[(1)] A polystyrene block prepared by the initial reaction (Step 1).
[(2)] A mikto polystyrene block formed by the multifunctional compound (Step 2).

EXAMPLE 5

This example discloses the fourth method of the present invention to prepare a multi-component copolymer containing a mikto polystyrene block without a tapered block, polybutadiene block being divided into two blocks. Polymerization was performed in the same conditions as in Example 2, including reactor, coupling agent, antioxidant, or the like. The mikto polystyrene block in the step 2 was prepared in the same manner as described in Example 1.

The progress of reaction and the added amount of the individual ingredients are presented in Table 16. The results of property measurements are summarized in Table 17.

TABLE 16

| | Ingredient | Run 1 | Run 2 |
|---|---|---|---|
| Step 1 | Cyclohexane (phm) | 300 | 300 |
| | Tetrahydrofuran (phm) | 0.078 | 0.075 |
| | n-butyl lithium initiator (phm) | 0.133 | 0.139 |
| | Styrene (phm) | 29.97 | 29.97 |
| Step 2 | Divinylbenzene (phm) | 0.053 | 0.080 |
| | 1,3-butadiene (phm) | 1.73 | 1.73 |
| Step 3 | 1,3-butadiene (phm) | 11.62 | |
| Step 4 | Styrene (phm) | 22.51 | |
| Step 5 | 1,3-butadiene (phm) | 11.66 | |
| Step 6 | Styrene (phm) | 22.51 | |
| Step 7 (Coupling) | ESO (phm) | 0.374 | 0.270 |
| Step 8 (Terminating polymerization) | Distilled water (phm) | 0.187 | 0.195 |
| | Carbon dioxide (phm) | 0.412 | 0.430 |
| Step 9 (Stabilizing) | Antioxidant mixture (phm) | 0.6 | |

TABLE 17

| Property | Run 1 | Run 2 |
|---|---|---|
| Molecular weight | | |
| S[(1)] (Mn/MWD) | 14400/1.04 | 13800/1.04 |
| MS[(2)] (Mn/MWD) | 19300/1.21 | 18500/1.19 |
| Final resin (Mw/MWD) | 183000/1.58 | 192000/1.96 |
| Melt index (g/10 min) | 9 | 8 |
| Tensile strength ($kg_f/cm^2$) | 261 | 263 |
| Elongation (%) | 330 | 328 |
| Bending strength ($kg_f/cm^2$) | 338 | 340 |
| Izod impact strength ($kJ/m^2$) | 4 | 4.4 |
| Hardness (Shore D) | 65 | 67 |

Note
[(1)] A polystyrene block prepared by the initial reaction (Step 1).
[(2)] A mikto polystyrene block formed by the multifunctional compound (Step 2).

EXAMPLE 6

This example discloses the fifth method of the present invention to prepare a multi-component copolymer containing a mikto polystyrene block, the polybutadiene block being divided into two blocks, the one of which forms a tapered block with styrene.

Polymerization was performed in the same conditions as in Example 2, including reactor, coupling agent, antioxidant, or the like. The mikto polystyrene block in the step 2 was prepared in the same manner as described in Example 1.

The progress of reaction and the added amount of the individual ingredients are presented in Table 18. The results of property measurements are summarized in Table 19.

TABLE 18

| | Ingredient | Run 1 | Run 2 |
|---|---|---|---|
| Step 1 | Cyclohexane (phm) | 300 | 300 |
| | Tetrahydrofuran (phm) | 0.078 | 0.903 |
| | n-butyl lithium initiator (phm) | 0.156 | 0.137 |
| | Styrene (phm) | 29.97 | 29.97 |
| Step 2 | Divinylbenzene (phm) | 0.067 | 0.053 |
| | 1,3-butadiene (phm) | 1.73 | 1.73 |
| Step 3 | 1,3-butadiene (phm) | 11.66 | |
| | Styrene (phm) | 22.52 | |
| Step 4 | 1,3-butadiene (phm) | 11.62 | |
| Step 5 | Styrene (phm) | 22.50 | |
| Step 6 (Coupling) | ESO (phm) | 0.374 | 0.290 |
| Step 7 (Terminating polymerization) | Distilled water (phm) | 0.219 | 0.193 |
| | Carbon dioxide (phm) | 0.483 | 0.424 |
| Step 8 (Stabilizing) | Antioxidant mixture (phm) | 0.6 | |

TABLE 19

| Property | Run 1 | Run 2 |
|---|---|---|
| Molecular weight | | |
| S[(1)] (Mn/MWD) | 12300/1.04 | 14000/1.04 |
| MS[(2)] (Mn/MWD) | 16100/1.18 | 17800/1.17 |
| Final resin (Mw/MWD) | 197000/1.75 | 223000/1.57 |
| Melt index (g/10 min) | 12 | 10 |
| Tensile strength ($kg_f/cm^2$) | 214 | 219 |
| Elongation (%) | 600 | 595 |
| Bending strength ($kg_f/cm^2$) | 280 | 285 |
| Izod impact strength ($kJ/m^2$) | 3.8 | 3.6 |
| Hardness (Shore D) | 63 | 65 |

Note
[(1)] A polystyrene block prepared by the initial reaction (Step 1).
[(2)] A mikto polystyrene block formed by the multifunctional compound (Step 2).

EXAMPLE 7

This example discloses the sixth method of the present invention to prepare a multi-component copolymer containing a mikto polystyrene block, the polybutadien block being divided into two blocks, the one of which forms a tapered block with styrene.

Polymerization was performed in the same conditions as in Example 2, including reactor, coupling agent, antioxidant, or the like. The mikto polystyrene block in the step 2 was prepared in the same manner as described in Example 1.

The progress of reaction and the added amount of the individual ingredients are presented in Table 20. The results of property measurements are summarized in Table 21.

TABLE 20

| | Ingredient | Run 1 | Run 2 | Run 3 |
|---|---|---|---|---|
| Step 1 | Cyclohexane (phm) | 300 | 300 | 300 |
| | Tetrahydrofuran (phm) | 0.069 | 0.108 | 0.108 |

TABLE 20-continued

| | Ingredient | Run 1 | Run 2 | Run 3 |
|---|---|---|---|---|
| | n-butyl lithium initiator (phm) | 0.147 | 0.182 | 0.177 |
| | Styrene (phm) | 29.97 | 45.00 | 45.00 |
| Step 2 | Divinylbenzene (phm) | 0.080 | 0.107 | 0.120 |
| | 1,3-butadiene (phm) | 1.73 | 2.00 | 2.00 |
| Step 3 | 1,3-butadiene (phm) | | 11.62 | |
| Step 4 | Styrene (phm) | | 22.50 | |
| Step 5 | 1,3-butadiene (phm) | | 11.66 | |
| | Styrene (phm) | | 22.52 | |
| Step 6 (Coupling) | ESO (phm) | 0.143 | 0.224 | 0.383 |
| Step 7 (Terminating polymerization) | Distilled water (phm) | 0.207 | 0.194 | 0.150 |
| | Carbon dioxide (phm) | 0.455 | 0.427 | 0.330 |
| Step 8 (Stabilizing) | Antioxidant mixture (phm) | | 0.6 | |

TABLE 21

| Property | Run 1 | Run 2 | Run 3 |
|---|---|---|---|
| Molecular weight | | | |
| S[1] (Mn/MWD) | 12900/1.03 | 13900/1.03 | 18000/1.03 |
| MS[2] (Mn/MWD) | 17300/1.19 | 18400/1.18 | 23600/1.22 |
| Final resin (Mw/MWD) | 237000/1.99 | 254000/1.99 | 245000/2.29 |
| Melt index (g/10 min) | 11 | 9 | 1 |
| Tensile strength (kg$_f$/cm$^2$) | 264 | 268 | 266 |
| Elongation (%) | 230 | 226 | 228 |
| Bending strength (kg$_f$/cm$^2$) | 305 | 309 | 307 |
| Izod impact strength (kJ/m$^2$) | 5.2 | 4.8 | 5.0 |
| Hardness (Shore D) | 65 | 66 | 64 |

Note
[1]A polystyrene block prepared by the initial reaction (Step 1).
[2]A mikto polystyrene block formed by the multifunctional compound (Step 2).

As described above, if necessary, the block copolymer resin of the present invention can be easily controlled in regard to the composition of the mikto block, which is freely applicable to the copolymer resin having different polymer chain architectures to adequately vary mechanical properties such as strength, flexibility, toughness and rigidity. Particularly, the present invention simplifies the process by adding only one charge of the initiator and the monomers to provide balanced properties and rheological properties, as a result of which uneconomically stern conditions for polymerization are not required.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for preparing a transparent block copolymer resin comprising:
polymerizing under solution polymerization conditions at least one vinyl aromatic monomer and at least one conjugated diene monomer in a ratio of 55 to 95 weighted vinyl aromatic monomer and 45 to 5 weight % conjugated diene monomer, wherein the polymerizing is conducted using a charge sequence of the following order:

(a) a vinyl aromatic monomer, a polar organic compound, polymerization solvent and an anionic initiator to prepare an anionic polymer block;

(b) a multifunctional vinyl aromatic compound and a conjugated diene monomer being added to the anionic polymer block to prepare a mikto block of polymer having a combined linear and nonlinear structure;

(c) a conjugated diene monomer;

(d) a vinyl aromatic monomer; and (e) a multifunctional coupling agent.

2. The method as claimed in claim 1, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | A. Polar organic compound | 0.001~0.15 |
| | Anionic initiator | 0.005~0.4 |
| | Vinyl aromatic monomer | 35~55 |
| (b) | Multifunctional vinyl aromatic compound | 0.00025~4 |
| | Conjugated diene monomer | 0.1~30 |
| (c) | Conjugated diene monomer | 5~45 |
| (d) | Vinyl aromatic monomer | 20~40 |
| (e) | Multifunctional coupling agent | 0.005~1.0. |

3. The method as claimed in claim 1, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | B. Polar organic compound | 0.01~0.14 |
| | Anionic initiator | 0.11~0.3 |
| | Vinyl aromatic monomer | 40~50 |
| (b) | Multifunctional vinyl aromatic compound | 0.022~0.9 |
| | Conjugated diene monomer | 0.2~15 |
| (c) | Conjugated diene monomer | 15~35 |
| (d) | Vinyl aromatic monomer | 25~35 |
| (e) | Multifunctional coupling agent | 0.15~0.55. |

4. The method as claimed in claim 1, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | C. Polar organic compound | 0.05~0.13 |
| | Anionic initiator | 0.16~0.24 |
| | Vinyl aromatic monomer | 43~47 |
| (b) | Multifunctional vinyl aromatic compound | 0.048~0.36 |
| | Conjugated diene monomer | 0.5~10 |
| (c) | Conjugated diene monomer | 20~30 |
| (d) | Vinyl aromatic monomer | 27~33 |

| Step | Ingredient | Content range (phm) |
|---|---|---|
| (e) | Multifunctional coupling agent | 0.35~0.47. |

5. The method as claimed in claim 1, wherein the mikto block of polymer prepared in the step (b) is represented by the following formula 1:

$SnD^{-+}Li$  Formula 1 wherein S is a polymer of the vinyl aromatic monomer; D is a multifunctional vinyl aromatic compound; $SnD^{-}$ is an active polymer mikto block formed by contacting the polymer block of the vinyl aromatic monomer with the multifunctional vinyl aromatic compound; n is an integer of 1 to 4 and represents the number of polymer mikto blocks of the vinyl aromatic monomer formed by the multifunctional vinyl aromatic compound; and $^{+}Li$ is a metal counter ion of the active polymer mikto block.

6. The method as claimed in claim 1, wherein in the step (b), the multifunctional vinyl aromatic compound and the conjugated diene monomer are added to the anionic polymer block in a simultaneous or instantaneously sequential manner.

7. The method as claimed in claim 1, wherein the multifunctional vinyl aromatic compound is divinylbenzene; and the conjugated diene monomer is butadiene or isoprene.

8. The method as claimed in claim 1, wherein the polymerization solvent is a cyclohexane.

9. The method as claimed in claim 1, wherein the polar organic compound as used in the step (a) is tetrahydrofuran.

10. The method as claimed in claim 1, wherein the vinyl aromatic monomer is styrene; the conjugated diene monomer is butadiene or isoprene; the anionic initiator is butyl lithium; and the multifunctional coupling agent is epoxydized soybean oil.

11. A copolymer prepared by the method according to claim 1.

12. A bubble pack formed from a copolymer prepared by the method according to claim 1.

13. A copolymer prepared by the method according to claim 10.

14. A bubble pack formed from a copolymer prepared by the method according to claim 10.

15. A method for preparing a transparent block copolymer resin comprising:

polymerizing under solution polymerization conditions at least one vinyl aromatic monomer and at least one conjugated diene monomer in a ratio of 55 to 95 wt. % vinyl aromatic monomer and 45 to 5 wt. % conjugated diene monomer, wherein the polymerizing is conducted using a charge sequence of the following order:

(a) a vinyl aromatic monomer, a polar organic compound, polymerization solvent and an anionic initiator to prepare an anionic polymer block;

(b) a multifunctional vinyl aromatic compound and a conjugated diene monomer being added to the anionic polymer block to prepare a mikto block of polymer having a combined linear and nonlinear structure;

(c) a conjugated diene monomer and a vinyl aromatic monomer being added in a simultaneous or instantaneously sequential manner; and (d) a multifunctional coupling agent.

16. The method as claimed in claim 15, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | D. Polar organic compound | 0.001~0.15 |
|  | Anionic initiator | 0.005~0.35 |
|  | Vinyl aromatic monomer | 32~52 |
| (b) | Multifunctional vinyl aromatic compound | 0.00025~3.5 |
|  | Conjugated diene monomer | 0.1~30 |
| (c) | E. Conjugated diene monomer | 5~45 |
|  | Vinyl aromatic monomer | 23~43 |
| (d) | Multifunctional coupling agent | 0.005~1.0. |

17. The method as claimed in claim 15, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | F. Polar organic compound | 0.01~0.14 |
|  | Anionic initiator | 0.1~0.3 |
|  | Vinyl aromatic monomer | 37~47 |
| (b) | G. Multifunctional Vinyl Aromatic compound | 0.02~0.9 |
|  | Conjugated diene monomer | 0.2~15 |
| (c) | Conjugated diene monomer | 15~35 |
|  | Vinyl aromatic monomer | 28~38 |
| (d) | H. Multifunctional coupling agent. | 0.1~0.5 |

18. The method as claimed in claim 15, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | I. Polar organic compound | 0.05~0.13 |
|  | Anionic initiator | 0.15~0.22 |
|  | Vinyl aromatic monomer | 40~44 |
| (b) | Multifunctional vinyl aromatic compound | 0.045~0.33 |
|  | Conjugated diene monomer | 0.5~10 |
| (c) | Conjugated diene monomer | 20~30 |
|  | Vinyl aromatic monomer | 30~36 |
| (d) | Multifunctional coupling agent | 0.33~0.44. |

19. The method as claimed in claim 15, wherein the mikto block of polymer prepared in the step (b) is represented by the following formula 1:

$SnD^{-+}Li$  Formula 1 wherein S is a polymer of the vinyl aromatic monomer; D is a multifunctional vinyl aromatic compound; $SnD^{-}$ is an active polymer mikto block formed by contacting the polymer block of the vinyl aromatic monomer with the multifunctional vinyl aromatic compound; n is an integer of 1 to 4 and represents the number of polymer mikto blocks of the vinyl aromatic monomer formed by the multifunctional vinyl aromatic compound; and $^+Li$ is a metal counter ion of the active polymer mikto block.

20. The method as claimed in claim 15, wherein in the step (b), the multifunctional vinyl aromatic compound and the conjugated diene monomer are added to the anionic polymer block in a simultaneous or instantaneously sequential manner.

21. The method as claimed in claim 15, wherein the multifunctional vinyl aromatic compound is divinylbenzene; and the conjugated diene monomer is butadiene or isoprene.

22. The method as claimed in claim 15, wherein the polymerization solvent is a cyclohexane.

23. The method as claimed in claim 15, wherein the polar organic compound as used in the step (a) is tetrahydrofuran.

24. The method as claimed in claim 15, wherein the vinyl aromatic monomer is styrene; the conjugated diene monomer is butadiene or isoprene; the anionic initiator is butyl lithium; and the coupling agent is epoxydized soybean oil.

25. A copolymer prepared by the method according to claim 15.

26. A bubble pack formed from a copolymer prepared by the method according to claim 15.

27. A copolymer prepared by the method according to claim 24.

28. A bubble pack formed from a copolymer prepared by the method according to claim 24.

29. A method for preparing a transparent block copolymer resin comprising:

polymerizing under solution polymerization conditions at least one vinyl aromatic monomer and at least one conjugated diene monomer in a ratio of 55 to 95 wt. % vinyl aromatic monomer and 45 to 5 wt. % conjugated diene monomer, wherein the polymerizing is conducted using a charge sequence of the following order:

(a) a vinyl aromatic monomer, a polar organic compound, polymerization solvent and an anionic initiator to prepare an anionic polymer block;

(b) a multifunctional vinyl aromatic compound and a conjugated diene monomer being added to the anionic polymer block to prepare a mikto block of polymer having a combined linear and nonlinear structure;

(c) a conjugated diene monomer and a vinyl aromatic monomer being added in a simultaneous or sequential manner;

(d) a conjugated diene monomer and a vinyl aromatic monomer being added in a simultaneous or instantaneously sequential manner; and (e) a multifunctional coupling agent.

30. The method as claimed in claim 29, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | J. Polar organic compound | 0.001~0.15 |
|  | Anionic initiator | 0.05~0.25 |
|  | Vinyl aromatic monomer | 19~31 |
| (b) | Multifunctional vinyl aromatic compound | 0.00025~2.5 |
| (c) | Conjugated diene monomer | 0.1~30 |
|  | Conjugated diene monomer | 3~23 |
|  | Vinyl aromatic monomer | 18~32 |
| (d) | Conjugated diene monomer | 2~22 |
|  | Vinyl aromatic monomer | 18~32 |
| (e) | Multifunctional coupling agent | 0.005~1.0. |

31. The method as claimed in claim 29, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | K. Polar organic compound | 0.01~0.14 |
|  | Anionic initiator | 0.07~0.2 |
|  | Vinyl aromatic monomer | 20~30 |
| (b) | Multifunctional vinyl aromatic compound | 0.014~0.6 |
|  | Conjugated diene monomer | 0.2~15 |
| (c) | Conjugated diene monomer | 8~28 |
|  | Vinyl aromatic monomer | 20~30 |
| (d) | Conjugated diene monomer | 7~17 |
|  | Vinyl aromatic monomer | 20~30 |
| (e) | Multifunctional coupling agent | 0.1~0.4. |

32. The method as claimed in claim 29, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | L. Polar organic compound | 0.05~0.13 |
|  | Anionic initiator | 0.09~0.13 |
|  | Vinyl aromatic monomer | 24~26 |
| (b) | Multifunctional vinyl aromatic compound | 0.027~0.195 |
|  | Conjugated diene monomer | 0.5~10 |
| (c) | Conjugated diene monomer | 11~15 |
|  | Vinyl aromatic monomer | 23~27 |
| (d) | Conjugated diene monomer | 9~15 |
|  | Vinyl aromatic monomer | 23~27 |
| (e) | Multifunctional coupling agent | 0.2~0.26. |

33. The method as claimed in claim 29, wherein the mikto block of polymer prepared in the step (b) is represented by the following formula 1:

$$S_nD^{-+}Li \qquad \text{Formula 1}$$

wherein S is a polymer of the vinyl aromatic monomer, D is a multifunctional vinyl aromatic compound; SnD is an active polymer mikto block formed by contacting the polymer block of the vinyl aromatic monomer with the multifunctional vinyl aromatic compound; n is an integer of 1 to 4 and represents the number of polymer mikto blocks of the vinyl aromatic monomer formed by the multifunctional vinyl aromatic compound; and $^+Li$ is a metal counter ion of the active polymer mikto block.

34. The method as claimed in claim 29, wherein in the step (b), the multifunctional vinyl aromatic compound and the conjugated diene monomer are added to the anionic polymer block in a simultaneous or instantaneously sequential manner.

35. The method as claimed in claim 29, wherein the multifunctional vinyl aromatic compound is divinylbenzene; and the conjugated diene monomer is butadiene or isoprene.

36. The method as claimed in claim 29, wherein the polymerization solvent is a cyclohexane.

37. The method as claimed in claim 29, wherein the polar organic compound as used in the step (a) is tetrahydrofuran.

38. The method as claimed in claim 29, wherein the vinyl aromatic monomer is styrene; the conjugated diene monomer is butadiene or isoprene; the anionic initiator is butyl lithium; and the coupling agent is epoxydized soybean oil.

39. A copolymer prepared by the method according to claim 29.

40. A bubble pack formed from a copolymer prepared by the method according to claim 29.

41. A copolymer prepared by the method according to claim 38.

42. A bubble pack formed from a copolymer prepared by the method according to claim 38.

43. A method for preparing a transparent block copolymer resin comprising:
polymerizing under solution polymerization conditions at least one vinyl aromatic monomer and at least one conjugated diene monomer in a ratio of 55 to 95 wt. % vinyl aromatic monomer and 45 to 5 wt. % conjugated diene monomer, wherein the polymerizing is conducted using a charge sequence of the following order:
(a) a vinyl aromatic monomer, a polar organic compound, a polymerization solvent and an anionic initiator to prepare an anionic polymer block;
(b) a multifunctional vinyl aromatic compound and a conjugated diene monomer being added to the anionic polymer block to prepare a mikto block of polymer having a combined linear and nonlinear structure;
(c) a conjugated diene monomer;
(d) a vinyl aromatic monomer;
(e) a conjugated diene monomer;
(f) a vinyl aromatic monomer; and
(g) a multifunctional coupling agent.

44. The method as claimed in claim 43, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | M. Polar organic compound | 0.001~0.15 |
|  | Anionic initiator | 0.005~0.25 |
|  | Vinyl aromatic monomer | 24~36 |
| (b) | Multifunctional vinyl aromatic compound | 0.00025~2.5 |
|  | Conjugated diene monomer | 0.1~30 |
| (c) | Conjugated diene monomer | 3~23 |
| (d) | Vinyl aromatic monomer | 15~29 |
| (e) | Conjugated diene monomer | 2~22 |
| (f) | Vinyl aromatic monomer | 16~30 |
| (g) | Multifunctional coupling agent | 0.005~1.0. |

45. The method as claimed in claim 43, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | N. Polar organic compound | 0.01~0.14 |
|  | Anionic initiator | 0.08~0.2 |
|  | Vinyl aromatic monomer | 25~35 |
| (b) | Multifunctional vinyl aromatic compound | 0.016~0.6 |
|  | Conjugated diene monomer | 0.2~15 |
| (c) | Conjugated diene monomer | 8~18 |
| (d) | Vinyl aromatic monomer | 17~27 |
| (e) | Conjugated diene monomer | 7~17 |
| (f) | Vinyl aromatic monomer | 18~28 |
| (g) | O. Multifunctional coupling agent. | 0.1~0.4 |

46. The method as claimed in claim 43, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | P. Polar organic compound | 0.05~0.13 |
|  | Anionic initiator | 0.11~0.16 |
|  | Vinyl aromatic monomer | 29~31 |
| (b) | Multifunctional vinyl aromatic compound | 0.033~0.24 |
|  | Conjugated diene monomer | 0.5~10 |
| (c) | Conjugated diene monomer | 11~15 |
| (d) | Vinyl aromatic monomer | 20~24 |
| (e) | Conjugated diene monomer | 9~15 |
| (f) | Vinyl aromatic monomer | 21~25 |
| (g) | Multifunctional coupling agent | 0.23~0.31. |

47. The method as claimed in claim 43, wherein the mikto block of polymer prepared in the step (b) is represented by the following formula 1:

$$S_nD^{+-}Li \qquad \text{Formula 1}$$

wherein S is a polymer of the vinyl aromatic monomer; D is a multifunctional vinyl aromatic compound; $SnD^-$ is an active polymer mikto block formed by contacting the polymer block of the vinyl aromatic monomer with the multifunctional vinyl aromatic compound; n is an integer of 1 to 4 and represents the number of polymer mikto blocks of the vinyl aromatic monomer formed by the multifunctional vinyl aromatic compound; and $^+Li$ is a metal counter ion of the active polymer mikto block.

48. The method as claimed in claim 43, wherein in the step (b), the multifunctional vinyl aromatic compound and the conjugated diene monomer are added to the anionic polymer block in a simultaneous or sequential manner.

49. The method as claimed in claim 43, wherein the multifunctional vinyl aromatic compound is divinylbenzene; and the conjugated diene monomer is butadiene or isoprene.

50. The method as claimed in claim 43, wherein the polymerization solvent is a cyclohexane.

51. The method as claimed in claim 43, wherein the polar organic compound as used in the step (a) is tetrahydrofuran.

52. The method as claimed in claim 43, wherein the vinyl aromatic monomer is styrene; the conjugated diene monomer is butadiene or isoprene; the anionic initiator is butyl lithium; and the coupling agent is epoxydized soybean oil.

53. A copolymer prepared by the method according to claim 43.

54. A bubble pack formed from a copolymer prepared by the method according to claim 43.

55. A copolymer prepared by the method according to claim 52.

56. A bubble pack formed from a copolymer prepared by the method according to claim 52.

57. A method for preparing a transparent block copolymer resin comprising:

polymerizing under solution polymerization conditions at least one vinyl aromatic monomer and at least one conjugated diene monomer in a ratio of 55 to 95 wt. % vinyl aromatic monomer and 45 to 5 wt. % conjugated diene monomer, wherein the polymerizing is conducted using a charge sequence of the following order:

(a) a vinyl aromatic monomer, a polar organic compound, a polymerization solvent and an anionic initiator to prepare an anionic polymer block;

(b) a multifunctional vinyl aromatic compound and a conjugated diene monomer being added to the anionic polymer block to prepare a mikto block of polymer having a combined linear and nonlinear structure;

(c) a conjugated diene monomer and a vinyl aromatic monomer being added in a simultaneous or instantaneously sequential manner;

(d) a conjugated diene monomer;

(e) vinyl aromatic monomer; and (f) a multifunctional coupling agent.

58. The method as claimed in claim 57, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | Q. Polar organic compound | 0.001~0.15 |
|  | Anionic initiator | 0.05~0.25 |
|  | Vinyl aromatic monomer | 22~34 |
| (b) | Multifunctional vinyl aromatic compound | 0.00025~2.5 |
|  | Conjugated diene monomer | 0.1~30 |
| (c) | Conjugated diene monomer | 4~24 |
|  | Vinyl aromatic monomer | 18~32 |
| (d) | Conjugated diene monomer | 1~21 |
| (e) | Vinyl aromatic monomer | 15~29 |
| (f) | Multifunctional coupling agent | 0.005~1.0. |

59. The method as claimed in claim 57, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | R. Polar organic compound | 0.01~0.14 |
|  | Anionic initiator | 0.08~0.2 |
|  | Vinyl aromatic monomer | 23~33 |

-continued

| Step | Ingredient | Content range (phm) |
|---|---|---|
| (b) | Multifunctional vinyl aromatic compound | 0.016~0.6 |
|  | Conjugated diene monomer | 0.2~15 |
| (c) | Conjugated diene monomer | 9~19 |
|  | Vinyl aromatic monomer | 20~30 |
| (d) | Conjugated diene monomer | 6~16 |
| (e) | Vinyl aromatic monomer | 17~27 |
| (f) | Multifunctional coupling agent | 0.1~0.4. |

60. The method as claimed in claim 57, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | S. Polar organic compound | 0.05~0.13 |
|  | Anionic initiator | 0.1~0.15 |
|  | Vinyl aromatic monomer | 26~30 |
| (b) | Multifunctional vinyl aromatic compound | 0.03~0.225 |
|  | Conjugated diene monomer | 0.5~10 |
| (c) | Conjugated diene monomer | 12~16 |
|  | Vinyl aromatic monomer | 24~26 |
| (d) | Conjugated diene monomer | 8~14 |
| (e) | Vinyl aromatic monomer | 20~24 |
| (f) | Multifunctional coupling agent | 0.21~0.29. |

61. The method as claimed in claim 57, wherein the mikto block of polymer prepared in the step (b) is represented by the following formula 1:

$$SnD^{-+}Li \qquad \text{Formula 1}$$

wherein S is a polymer of the vinyl aromatic monomer; D is a multifunctional vinyl aromatic compound; $SnD^-$ is an active polymer mikto block formed by contacting the polymer block of the vinyl aromatic monomer with the multifunctional vinyl aromatic compound; n is an integer of 1 to 4 and represents the number of polymer mikto blocks of the vinyl aromatic monomer formed by the multifunctional vinyl aromatic compound; and $^+Li$ is a metal counter ion of the active polymer mikto block.

62. The method as claimed in claim 57, wherein in the step (b), the multifunctional vinyl aromatic compound and the conjugated diene monomer are added to the anionic polymer block in a simultaneous or instantaneously sequential manner.

63. The method as claimed in claim 57, wherein the multifunctional vinyl aromatic compound is divinylbenzene; and the conjugated diene monomer is butadiene or isoprene.

64. The method as claimed in claim 57, wherein the polymerization solvent is a cyclohexane.

65. The method as claimed in claim 57, wherein the polar organic compound as used in the step (a) is tetrahydrofuran.

66. The method as claimed in claim 57, wherein the vinyl aromatic monomer is styrene; the conjugated diene monomer is butadiene or isoprene; the anionic initiator is butyl lithium; and the coupling agent is epoxydized soybean oil.

67. A copolymer prepared by the method according to claim 57.

68. A bubble pack formed from a copolymer prepared by the method according to claim 57.

69. A copolymer prepared by the method according to claim 66.

70. A bubble pack formed from a copolymer prepared by the method according to claim 66.

71. A method for preparing a transparent block copolymer resin comprising:

polymerizing under solution polymerization conditions at least one vinyl aromatic monomer and at least one conjugated diene monomer in a ratio of 55 to 95 wt. % vinyl aromatic monomer and 45 to 5 wt. % conjugated diene monomer, wherein the polymerizing is conducted using a charge sequence of the following order:

(a) a vinyl aromatic monomer, a polar organic compound, a polymerization solvent and an anionic initiator to prepare an anionic polymer block;

(b) a multifunctional vinyl aromatic compound and a conjugated diene monomer being added to the anionic polymer block to prepare a mikto block of polymer having a combined linear and nonlinear structure;

(c) a conjugated diene monomer;

(d) a vinyl aromatic monomer;

(e) a conjugated diene monomer and a vinyl aromatic monomer being added in a simultaneous or instantaneously sequential manner; and (f) a multifunctional coupling agent.

72. The method as claimed in claim 71, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | T. Polar organic compound | 0.001~0.15 |
|  | Anionic initiator | 0.005~0.25 |
|  | Vinyl aromatic monomer | 22~34 |
| (b) | Multifunctional vinyl aromatic compound | 0.00025~2.5 |
|  | Conjugated diene monomer | 0.1~30 |
| (c) | Conjugated diene monomer | 1~21 |
| (d) | Vinyl aromatic monomer | 15~29 |
| (e) | Conjugated diene monomer | 4~24 |
|  | Vinyl aromatic monomer | 18~32 |
| (f) | Multifunctional coupling agent | 0.005~1.0. |

73. The method as claimed in claim 71, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | U. Polar organic compound | 0.01~0.14 |
|  | Anionic initiator | 0.08~0.2 |
|  | Vinyl aromatic monomer | 23–33 |
| (b) | Multifunctional vinyl aromatic compound | 0.016~0.6 |
|  | Conjugated diene monomer | 0.2~15 |
| (c) | Conjugated diene monomer | 6~16 |
| (d) | Vinyl aromatic monomer | 17~27 |
| (e) | Conjugated diene monomer | 9~19 |
|  | Vinyl aromatic monomer | 20~30 |

-continued

| Step | Ingredient | Content range (phm) |
|---|---|---|
| (f) | Multifunctional coupling agent | 0.1~0.4. |

74. The method as claimed in claim 71, wherein the monomers, the polar organic compound, the anionic initiator, the multifunctional vinyl aromatic compound and the coupling agents are added in each step in the following ranges of addition:

| Step | Ingredient | Content range (phm) |
|---|---|---|
| (a) | V. Polar organic compound | 0.05~0.13 |
|  | Anionic initiator | 0.1~0.15 |
|  | Vinyl aromatic monomer | 26~30 |
| (b) | Multifunctional vinyl aromatic compound | 0.03~0.225 |
|  | Conjugated diene monomer | 0.5~10 |
| (c) | Conjugated diene monomer | 8~14 |
| (d) | Vinyl aromatic monomer | 20~24 |
| (e) | Conjugated diene monomer | 12~16 |
|  | Vinyl aromatic monomer | 24~26 |
| (f) | Multifunctional coupling agent | 0.21~0.29. |

75. The method as claimed in claim 71, wherein the mikto block of polymer prepared in the step (b) is represented by the following formula 1:

$$S_nD^-{}^+Li \qquad \text{Formula 1}$$

wherein S is a polymer of the vinyl aromatic monomer; D is a multifunctional vinyl aromatic compound; $S_nD^-$ is an active polymer mikto block formed by contacting the polymer block of the vinyl aromatic monomer with the multifunctional vinyl aromatic compound; n is an integer of 1 to 4 and represents the number of polymer mikto blocks of the vinyl aromatic monomer formed by the multifunctional vinyl aromatic compound; and $^+Li$ is a metal counter ion of the active polymer mikto block.

76. The method as claimed in claim 71, wherein in the step (b), the multifunctional vinyl aromatic compound and the conjugated diene monomer are added to the anionic polymer block in a simultaneous or instantaneously sequential manner.

77. The method as claimed in claim 71, wherein the multifunctional vinyl aromatic compound is divinylbenzene; and the conjugated diene monomer is butadiene or isoprene.

78. The method as claimed in claim 71, wherein the polymerization solvent is a cyclohexane.

79. The method as claimed in claim 71, wherein the polar organic compound as used in the step (a) is tetrahydrofuran.

80. The method as claimed in claim 71, wherein the vinyl aromatic monomer is styrene; the conjugated diene monomer is butadiene or isoprene; the anionic initiator is butyl lithium; and the coupling agent is epoxydized soybean oil.

81. A copolymer prepared by the method according to claim 71.

82. A bubble pack formed from a copolymer prepared by the method according to claim 71.

83. A copolymer prepared by the method according to claim 80.

84. A bubble pack formed from a copolymer prepared by the method according to claim 80.

* * * * *